(12) United States Patent
Van Cleve

(10) Patent No.: US 9,170,143 B2
(45) Date of Patent: Oct. 27, 2015

(54) VIBRATING FLOW METER HAVING A PREDETERMINED RESISTANCE RATIO TO A TEMPERATURE RATIO BETWEEN THE CURVED TUBE AND THE BALANCED STRUCTURE

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 190 days.

(21) Appl. No.: 13/982,451

(22) PCT Filed: Feb. 23, 2011

(86) PCT No.: PCT/US2011/025927
§ 371 (c)(1),
(2), (4) Date: Jul. 29, 2013

(87) PCT Pub. No.: WO2012/115639
PCT Pub. Date: Aug. 30, 2012

(65) Prior Publication Data
US 2013/0305837 A1 Nov. 21, 2013

(51) Int. Cl.
*G01F 1/84* (2006.01)
*G01F 15/02* (2006.01)

(52) U.S. Cl.
CPC ............... *G01F 1/84* (2013.01); *G01F 1/8418* (2013.01); *G01F 1/8436* (2013.01); *G01F 1/8472* (2013.01); *G01F 15/022* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 4,768,384 A | 9/1988 | Flecken et al. | |
| 5,317,928 A * | 6/1994 | Young | 73/32 R |
| 6,327,915 B1 | 12/2001 | Van Cleve et al. | |
| 2004/0187599 A1 | 9/2004 | Drahm et al. | |
| 2005/0039547 A1* | 2/2005 | Bitto et al. | 73/861.355 |
| 2007/0151371 A1 | 7/2007 | Bitto et al. | |
| 2007/0186684 A1* | 8/2007 | Pham | 73/861.357 |
| 2007/0199389 A1* | 8/2007 | Tombs | 73/861.357 |
| 2013/0139613 A1* | 6/2013 | Van Cleve | 73/861.355 |

FOREIGN PATENT DOCUMENTS

| | | |
|---|---|---|
| CN | 1371470 A | 9/2002 |
| JP | 58151518 A | 9/1983 |
| WO | 0102816 A2 | 1/2001 |

* cited by examiner

*Primary Examiner* — Harshad R Patel
(74) *Attorney, Agent, or Firm* — The Ollila Law Group LLC

(57) ABSTRACT

A vibrating flow meter (205) is provided. The vibrating flow meter (205) includes a single curved flow conduit (210), a conduit temperature sensor $T_1$ (291) affixed to the single curved flow conduit (210), a balance structure (208) affixed to and opposing the single curved flow conduit (210), and a balance temperature sensor $T_2$ (292) affixed to the balance structure (208). A conduit temperature sensor resistance of the conduit temperature sensor $T_1$ (291) and a balance structure temperature sensor resistance of the balance temperature sensor $T_2$ (meter2) are selected to form a predetermined resistance ratio.

33 Claims, 7 Drawing Sheets

VIBRATING FLOW METER HAVING A PREDETERMINED RESISTANCE RATIO TO A TEMPERATURE RATIO BETWEEN THE CURVED TUBE AND THE BALANCED STRUCTURE

BACKGROUND OF THE INVENTION

1. Field of the Invention

The present invention relates to a vibrating flow meter and method, and more particularly, to a vibrating flow meter and method for measuring temperature.

2. Statement of the Problem

Vibrating flow meters can be affected by various operational factors. One environmental factor that can affect the accuracy of a vibrating flow meter is temperature. This can include the temperature of the flow material. This can further include the temperature of the meter environment, such as the surrounding air and the conduits connected to the flow meter, for example.

A vibrating flow meter is typically designed and calibrated for operation at an expected temperature or range of temperatures. Deviation from an expected temperature or range of temperatures can affect measurements made by the flow meter. For example, the stiffness of the flowmeter structure is affected by temperature and can affect mass flow rate measurements. In addition, changes in temperature can affect a resonant frequency of the vibrating flow meter.

Temperature effects can be compensated for in the flow meter. A typical temperature compensation approach in the prior art is to affix a temperature sensor to the side of the flowmeter conduit and use a temperature measurement to scale meter output in a known manner. This can include temperature compensation for changes in elastic modulus in the meter structure due to changes in temperature, where the resonant frequency of the meter may change with temperature. The typical straight tube meter might also require a temperature sensor on the balance structure and/or the case. The difference between the balance/case temperature and the flow conduit temperature is used for compensation for thermal stress (i.e., tension or compression forces) due to changes in temperature, wherein physical dimensions of the meter may change.

FIG. 1 depicts a single conduit type vibrating flow meter 100 according to the prior art. As shown, the flow meter includes a case 103 enclosing a balance bar 102. The balance bar 102 is cylindrical and encloses conduit 101. Case 103 has end elements 104 with end faces 114 coupled by neck elements 105 to input and output flanges 106. Element 107 is the input to the flow meter; element 108 is the output. Conduit 101 has an input end 109 connected to an opening in case end 104 at element 112 which is the brace bar portion of case end 104. Brace bar portion 112 is coupled to neck element 105. On the right side, the output end 113 of conduit 101 is coupled to the case end 104 at location 112 where case end 104 joins neck element 105.

In operation, conduit 101 and balance bar 102 are vibrated in phase opposition by a driver (not shown). With a fluid flowing therein, the vibration of conduit 101 induces a Coriolis response that is detected by pick-off sensors (not shown). The outputs of the pickoff sensors are applied to electronics that processes the signals to derive the desired information pertaining to the flowing substance, such as for example a mass flow rate, a density, a viscosity, etc. The phase displacement between the pick-off sensors represents information pertaining to a mass flow rate of the fluid. A resonant frequency at either pickoff sensor represents information pertaining to a density of the fluid.

The prior art single tube meter is kept in balance over a range of fluid densities by way of a design that automatically adjusts the amplitude ratio between the flow conduit and the balance bar. This has a significant drawback in that it results in the repositioning of motionless nodes that reside along the axis of the vibrating structure. Node relocation is a problem in flow meters because the nodes are typically located on the conduit where the balance structure joins the conduit. Accordingly, the area between the nodes usually defines the active length of the conduit. The active length affects the measurement sensitivity. Further, if the nodes are repositioned, then the end portions of the tube may vibrate. This further causes the flanges to vibrate. These undesirable vibrations can further affect the measurement sensitivity.

In thermal compensation, the temperatures of different structural parts of the meter can differ in their importance to the data output of the meter. The concept of weighting the importance of a local temperature is key. If raising the temperature of the case by 10 degrees (compared to the flow conduit temperature) results in a change in indicated flow rate of 1%, and if raising the temperature of the balance structure 10 degrees results in a change in the indicated flow rate of 2%, then the balance structure temperature is said to be twice as important as the case temperature in compensating for thermal effects. The importance of the local temperature is proportional to its impact on the indicated flow rate and density. This importance of local temperatures to a meter's performance can be determined either through experiment or, as is more commonly done, through computer modeling.

In the past, temperature compensation has consisted of one temperature sensor on the flow conduit to compensate for modulus shift with temperature. A temperature sensor network comprising two or more standard temperature sensors on the balance structure and/or case has been used to compensate for thermal stress. These standard temperature sensors are usually RTDs and have a standard resistance, such as 100 ohms at zero degrees C. The resistance of RTDs increases with temperature so that the temperature of a RTD is determined from its resistance.

In a prior art thermal stress temperature compensation network, for instance, the counterbalance temperature might be twice as important for generating the output data as the case temperature. Such a meter would have two standard temperature sensors on the counterbalance and one standard temperature sensor on the case. The sensors on the counterbalance and case would be connected in series. Their resistances would thus be added. Dividing the total resistance by three gives the average resistance and thus the weighted average temperature. The result would be a temperature measurement that weighted the balance structure temperature twice as heavily as the case temperature in generating a weighted average temperature measurement for thermal stress compensation.

The thermal stress compensation network is important in straight tube meters where the change in temperature of non-tube components can put the flow conduit in tension or compression and change its frequency and sensitivity to flow. In curved tube meters, thermal stress is of less concern because the flow conduit can bend slightly to accommodate the changing dimensions of other meter components. The result is that curved tube meters show only very slight changes in frequency or sensitivity to flow due to the tensioning effects of temperature change of the non-tube components.

Single curved tube meters have another problem. They use the same amplitude-ratio balancing design as single straight tube meters. However, because the flow conduit is much less stiff, the balance structure is also much less stiff and has a much more active role in determining the vibration natural frequency. In other words, a modulus shift in the balance structure can have as large an effect on the system frequency as a modulus shift in the flow conduit. Because the frequency is fundamental in determining fluid density, and because density is necessary for compensating the flow output, it is necessary to compensate the output data for the temperature of the balance structure.

The balance structure, in its deformation during drive vibration, has areas of relatively high stress and areas of relatively low stress. The areas of high stress are more important with respect to drive frequency than the areas of low stress. The concept of importance is the same as for straight tube meters, except the straight tube meter areas of importance change the frequency by putting the conduit in tension/compression, whereas in single curved tube meters the areas of importance change the frequency through modulus shift of the balance structure.

The prior art compensation method of using multiple standard temperature sensors has drawbacks in either straight or curved tube meters. The required temperature sensor network can become complex, requiring numerous temperature sensors if the balance bar temperature importance is anything but an integer multiple of the case temperature importance. For instance, the single conduit meter shown in FIG. 1 has a case temperature that is 3/8 as important as the balance structure temperature. The prior art configuration of this network would be three temperature sensors located on the case and eight temperature sensors located on the balance structure. All eleven temperature sensors would be connected in series.

Such a solution is accompanied by drawbacks. Numerous temperature sensors are required. This results in a high overall resistance. Further, a complex circuit and numerous wires are needed. Materials costs are increased. Manufacturing costs are increased. More resistive temperature sensors increase the likelihood of wiring faults and operational failures, where one failure in a series circuit of multiple resistive devices renders the circuit inoperative. More resistive temperature sensors will likely increase the additive tolerance error.

ASPECTS OF THE INVENTION

In one aspect of the invention, a vibrating flow meter comprises:
  a single curved flow conduit;
  a conduit temperature sensor $T_1$ affixed to the single curved flow conduit;
  a balance structure affixed to and opposing the single curved flow conduit; and
  a balance temperature sensor $T_2$ affixed to the balance structure, wherein a conduit temperature sensor resistance of the conduit temperature sensor $T_1$ and a balance structure temperature sensor resistance of the balance temperature sensor $T_2$ are selected to form a predetermined resistance ratio.

Preferably, the predetermined resistance ratio corresponds to a temperature importance ratio between the single curved flow conduit and the balance structure.

Preferably, the balance structure comprises a base coupled to the single curved flow conduit and a driven structure extending from the base, with a first driver portion of a vibratory driver being affixed to the driven structure and configured to interact with a second driver portion affixed to the single curved flow conduit.

Preferably, the driven structure comprises a cantilevered arm that extends generally orthogonally from the base.

Preferably, the predetermined resistance ratio corresponds to a temperature importance ratio between the single curved flow conduit and the driven structure.

Preferably, the predetermined resistance ratio corresponds to a temperature importance ratio between the single curved flow conduit and the base combined with the driven structure.

Preferably, the conduit temperature sensor resistance and the balance structure temperature sensor resistance are used to compensate a shift in elastic modulus with temperature of the single curved flow conduit.

Preferably, the conduit temperature sensor resistance and the balance structure temperature sensor resistance are used to compensate a shift in elastic modulus with temperature of the balance structure.

Preferably, the conduit temperature sensor resistance and the balance structure temperature sensor resistance are used to compensate a thermal stress with temperature of the single curved flow conduit.

Preferably, the conduit temperature sensor resistance and the balance structure temperature sensor resistance are used to compensate a thermal stress with temperature of the balance structure.

Preferably, the balance temperature sensor $T_2$ further comprises two or more balance temperature sensors $T_2$ and $T_3$ affixed to one or more locations of the balance structure and generate a balance structure temperature signal, wherein the two or more balance structure temperature sensor resistances at the one or more balance structure locations form a combined balance structure resistance related to thermal importances of the one or more balance structure locations.

In one aspect of the invention, a method of measuring temperature in a vibrating flow meter comprises:
  measuring a conduit electrical current flowing through a conduit temperature sensor $T_1$ affixed to a single curved flow conduit of the vibrating flow meter;
  measuring a balance electrical current flowing through a balance temperature sensor $T_2$ affixed to a balance structure of the vibrating flow meter, with the balance structure being affixed to and opposing the single curved flow conduit; and
  performing one or more flow meter temperature compensations using the temperature measurement, wherein a conduit temperature sensor resistance of the conduit temperature sensor $T_1$ and a balance structure temperature sensor resistance of the balance temperature sensor $T_2$ are selected to form a predetermined resistance ratio.

Preferably, the predetermined resistance ratio corresponds to a temperature importance ratio between the single curved flow conduit and the balance structure.

Preferably, the balance structure comprises a base coupled to the single curved flow conduit and a driven structure extending from the base, with a first driver portion of a vibratory driver being affixed to the driven structure and configured to interact with a second driver portion affixed to the single curved flow conduit.

Preferably, the driven structure comprises a cantilevered arm that extends generally orthogonally from the base.

Preferably, the predetermined resistance ratio corresponds to a temperature importance ratio between the single curved flow conduit and the driven structure.

Preferably, the predetermined resistance ratio corresponds to a temperature importance ratio between the single curved flow conduit and the base combined with the driven structure.

Preferably, the conduit temperature sensor resistance and the balance structure temperature sensor resistance are used to compensate a shift in elastic modulus with temperature of the single curved flow conduit.

Preferably, the conduit temperature sensor resistance and the balance structure temperature sensor resistance are used to compensate a shift in elastic modulus with temperature of the balance structure.

Preferably, the conduit temperature sensor resistance and the balance structure temperature sensor resistance are used to compensate a thermal stress with temperature of the single curved flow conduit.

Preferably, the conduit temperature sensor resistance and the balance structure temperature sensor resistance are used to compensate a thermal stress with temperature of the balance structure.

Preferably, the balance temperature sensor $T_2$ further comprises two or more balance temperature sensors $T_2$ and $T_3$ affixed to one or more locations of the balance structure and generating a balance structure temperature signal, wherein the two or more balance structure temperature sensor resistances at the one or more balance structure locations form a combined balance structure resistance related to thermal importances of the one or more balance structure locations.

In one aspect of the invention, a method of forming a vibrating flow meter comprises:
 forming a flow meter assembly including a single curved flow conduit and a balance structure affixed to and opposing the single curved flow conduit;
 affixing a conduit temperature sensor $T_1$ to the single curved flow conduit; and
 affixing a balance temperature sensor $T_2$ to the balance structure, with a conduit temperature sensor resistance of the conduit temperature sensor $T_1$ and a balance structure temperature sensor resistance of the balance temperature sensor $T_2$ being selected to form a predetermined resistance ratio.

Preferably, the predetermined resistance ratio corresponds to a temperature importance ratio between the single curved flow conduit and the balance structure.

Preferably, the balance structure comprises a base coupled to the single curved flow conduit and a driven structure extending from the base, with a first driver portion of a vibratory driver being affixed to the driven structure and configured to interact with a second driver portion affixed to the single curved flow conduit.

Preferably, the driven structure comprises a cantilevered arm that extends generally orthogonally from the base.

Preferably, the predetermined resistance ratio corresponds to a temperature importance ratio between the single curved flow conduit and the driven structure.

Preferably, the predetermined resistance ratio corresponds to a temperature importance ratio between the single curved flow conduit and the base combined with the driven structure.

Preferably, the conduit temperature sensor resistance and the balance structure temperature sensor resistance are used to compensate a shift in elastic modulus with temperature of the single curved flow conduit.

Preferably, the conduit temperature sensor resistance and the balance structure temperature sensor resistance are used to compensate a shift inelastic modulus with temperature of the balance structure.

Preferably, the conduit temperature sensor resistance and the balance structure temperature sensor resistance are used to compensate a thermal stress with temperature of the single curved flow conduit.

Preferably, the conduit temperature sensor resistance and the balance structure temperature sensor resistance are used to compensate a thermal stress with temperature of the balance structure.

Preferably, affixing the balance temperature sensor $T_2$ further comprises affixing two or more balance temperature sensors $T_2$ and $T_3$ to one or more locations of the balance structure and generating a balance structure temperature signal, wherein the two or more balance structure temperature sensor resistances at the one or more balance structure locations form a combined balance structure resistance related to thermal importances of the one or more balance structure locations.

DETAILED DESCRIPTION OF THE INVENTION

FIGS. 2-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
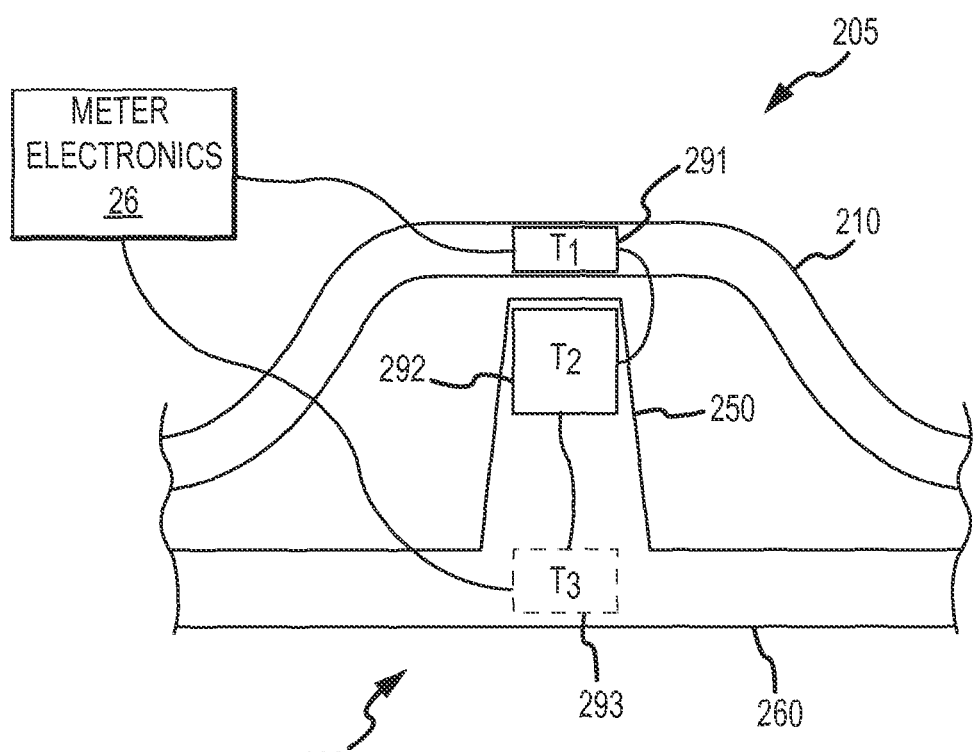
FIG. 2 shows a vibrating flow meter according to the invention.

FIG. 2 shows a vibrating flow meter 205 according to the invention. The vibrating flow meter 205 comprises a Coriolis mass flow meter or a vibrating densitometer. The vibrating flow meter 205 includes a flow conduit 210, a base 260 coupled to the flow conduit 210, and a driven member 250 that extends from the base 260 (see also FIGS. 6-9 and the accompanying discussion below). A driver 220 (see FIG. 6 and the accompanying discussion) is formed of components affixed to the conduit 210 and to the driven member 250. During operation of the vibrating flow meter 205, the driver 220 vibrates the flow conduit 210 with respect to the driven structure 250. The driver 220 will cause the driven member 250 to vibrate substantially in opposition to the flow conduit 210. Consequently, when the flow conduit 210 is moved in one direction, the driven member 250 will be moved substantially in the opposite direction, counter-balancing the flow conduit 210. The flow conduit 210 may vibrate with an amplitude and frequency that is the same as, or different from, the vibrational characteristics of the balance structure 208.

Although a curved flow conduit is shown, the temperature sensors are not limited to curved conduit flow meters. Likewise, although a single flow conduit is shown, the temperature sensors according to the invention are not limited to single conduit flow meters or flow meters that employ a balance bar or other balance structure.

The vibrating flow meter 205 further includes a conduit temperature sensor $T_1$ 291 and a balance temperature sensor $T_2$ 292 configured for modulus compensation. In some embodiments, the temperature sensors can comprise resistive temperature devices (RTDs). The conduit temperature sensor $T_1$ 291 is affixed to the flow conduit 210 and measures the flow conduit temperature. The conduit temperature sensor $T_1$ 291 generates a flow conduit temperature signal. Although the conduit temperature sensor $T_1$ 291 is shown as being located near the driver location at the center of the flow conduit 210, it should be understood that the conduit temperature sensor $T_1$ 291 can be located anywhere on the flow conduit 210.

The balance temperature sensor $T_2$ 292 is affixed to the balance structure 208 and measures the balance structure temperature. The balance temperature sensor $T_2$ 292 can be affixed to the driven member 250 or can be affixed to the base 260, for example. The balance temperature sensor $T_2$ 292 generates a driven member temperature signal. It should be understood that the balance temperature sensor $T_2$ 292 can be located anywhere on the balance structure 208.

In some embodiments, the balance temperature sensor $T_2$ 292 is affixed to the driven member 250, as the driven member 250 is most likely to be affected by modulus changes with temperature. In some embodiments, the driven member 250 comprises a cantilevered arm that extends generally orthogonally from the base 260. Alternatively, the balance temperature sensor $T_2$ 292 can be mounted to the base 260. However, the location of the balance temperature sensor $T_2$ 292 is not restricted to any particular position, and could be located at any desired spot on the balance structure 208.

In the figure, the balance temperature sensor $T_2$ 292 is represented as being physically larger than the conduit temperature sensor $T_1$ 291. The difference in physical proportions is done to show a possible difference between internal resistances of the conduit temperature sensor $T_1$ 291 and the balance temperature sensor $T_2$ 292 (the resistances can be equal, however). The difference illustrates that the resistance of the conduit temperature sensor $T_1$ 291 and the resistance of the balance temperature sensor $T_2$ 292 are chosen to provide a predetermined resistance ratio. The resistance ratio is set according to the relative importance of local temperatures on the output data. This is done where a conduit temperature response differs from a base temperature response, e.g., where a change in temperature during operation of the vibrating flow Meter 205 (with all other factors remaining unchanged) will result in a change in measurement signals generated by one or both pick-off sensors 230 and 231.

The vibrating flow meter 205 of some embodiments includes a predetermined resistance ratio corresponding to a temperature importance ratio between the flow conduit 210 and the balance structure 208. The vibrating flow meter 205 of some embodiments includes a predetermined resistance ratio corresponding to a temperature importance ratio between the flow conduit 210 and the driven structure 250. The vibrating flow meter 205 of some embodiments includes a predetermined resistance ratio corresponding to a temperature importance ratio between the flow conduit 210 and the base 260.

Alternatively, or in addition, a predetermined resistance ratio can be formed on the driven structure 250 versus the base 260 of the balance structure 208. The driven structure 250 may include the temperature sensor $T_2$ 292 and the base 260 can include a temperature sensor $T_3$ 293 (dashed lines). The temperature sensor $T_2$ 292 and the temperature sensor $T_3$ 293 may form a second resistance ratio, if desired, wherein the thermal importance of the driven structure 250 versus the base 260 may be fully characterized.

The temperature importance ratio can comprise a quantification of how a change in temperature will affect the elastic modulus of that component. The temperature importance ratio can quantify how a change in flow fluid temperature (or environmental temperature) will transfer into the component. For example, the base ends respond more quickly to fluid temperature changes than the base center. Temperature sensors may therefore be located at the ends and center of the base 260. These sensors may be selected to have the proper resistance ratio to match their relative importance. The resistance of the sensors on the base 260 can then be added to establish the desired importance (and resistance) ratio with the flow conduit 210.

The temperature importance ratio can comprise an experimentally-derived value in some embodiments. In other embodiments, the temperature importance ratio can be determined from the known heat transfer properties of the flow meter materials and the known quantities of these materials, such as through computer modeling. However, it should be understood that the temperature importance ratio can be obtained in other ways.

The temperature sensor resistance values can be set or formed in any suitable manner. For example, a temperature sensor can be formed by trimming (such as laser trimming or etching, for example), cutting or burning out elements of a resistor ladder, welding or joining together resistive units, et cetera.

In some embodiments, where the total resistance $R_{TOT}$ is not a concern, the temperature sensors 291 and 292 may be chosen in any manner. For example, one temperature sensor can be chosen to be a standard resistance and a second temperature sensor can be configured to obtain the predetermined resistance ratio. Alternatively, the total resistance $R_{TOT}$ can first be chosen, and then one or both temperature sensors can be configured to obtain the predetermined resistance ratio. This approach ensures that the total resistance $R_{TOT}$ of the two temperature sensors of the temperature sensor network is not too large or too small.

A method of measuring temperature in a vibrating flow meter according to some embodiments comprises measuring an electrical current flowing through a conduit temperature sensor $T_1$ affixed to a flow conduit of the vibrating flow meter and through a balance temperature sensor $T_2$ affixed to a balance structure of the vibrating flow meter, with the electrical current comprising a temperature measurement, and performing one or more flow meter temperature compensations using the temperature measurement. A conduit temperature sensor resistance of the conduit temperature sensor $T_1$ 291 and a balance structure temperature sensor resistance of the balance temperature sensor $T_2$ 292 are selected to form a predetermined resistance ratio.

A method of forming a vibrating flow meter according to some embodiments comprises forming a flow meter assembly including a balance structure and a flow conduit, affixing a conduit temperature sensor $T_{1\,291}$ to the flow conduit, and affixing a balance temperature sensor $T_2$ 292 to the balance structure. A conduit temperature sensor resistance of the conduit temperature sensor $T_1$ 291 and a balance structure temperature sensor resistance of the balance temperature sensor $T_2$ 292 are selected to form a predetermined resistance ratio.

In some embodiments, one or more additional balance structure temperature sensors, such as temperature sensors $T_2$ 292 and $T_3$ 293 in FIG. 2, may be included in order to fully characterize the balance structure 208. As an example, where the base temperature is twice as important as the driven structure temperature, then twice as many temperature sensor elements can be affixed to the base 260 of the balance structure 208 versus the driven structure 250. As a consequence, a temperature change in the base 260 will have twice the effect on sensor electrical resistance as a temperature change in the driven structure 250. The resistance change of the three temperature sensors in series may then be divided by three to give the weighted average temperature of the balance structure 208. Multiple temperature sensors can ago be put in parallel, or in other electrical network configurations, in order to characterize the thermal importance of regions of the balance structure 208.

The temperature sensors according to the invention provide several benefits. The temperature sensors according to the invention require only two sensor elements for the vibrating flow meter 205. The temperature sensors according to the invention require only two wires. The need for fewer resistive elements means fewer opportunities for tolerance errors. The need for fewer resistive elements means a smaller statistical likelihood of having additive tolerance problems.

The temperature sensors according to the invention provide electrical resistances in proportion to the thermal importance of the components. Consequently, temperature compensation is more easily achieved and is more accurate and representative.

The invention addresses the problem of unequal thermal effects by employing temperature sensors having resistances according to a predetermined resistance ratio. This can include using custom-made temperature sensors, wherein the ratio of the base resistance (i.e., the resistance at 0 degrees C.) of the conduit temperature sensor $T_1$ 291 to the base resistance of the balance temperature sensor $T_2$ 292 can be equal to the ratio of the importance of the flow conduit and balance structure temperatures.

For instance, a standard temperature sensor has a resistance of 100 ohms. If this temperature sensor was used to measure the balance structure temperature, a temperature sensor with a base resistance of 37.5 ohms could be used to measure the flow conduit temperature, with the resistance ratio being 37.5 ohms to 100 ohms, or a resistance ratio of about 3:8. But, in contrast to the prior art, only two temperature sensors are needed, and not eleven temperature sensors. If the two temperature sensors are made of the same material, having essentially the same temperature coefficient, then when connected in series, they will give the desired result. Subsequently, the change in resistance due to the sensed combined temperature will accurately predict the change in mass flow rate and/or vibrational frequency with the change in temperature.

Figure 3:
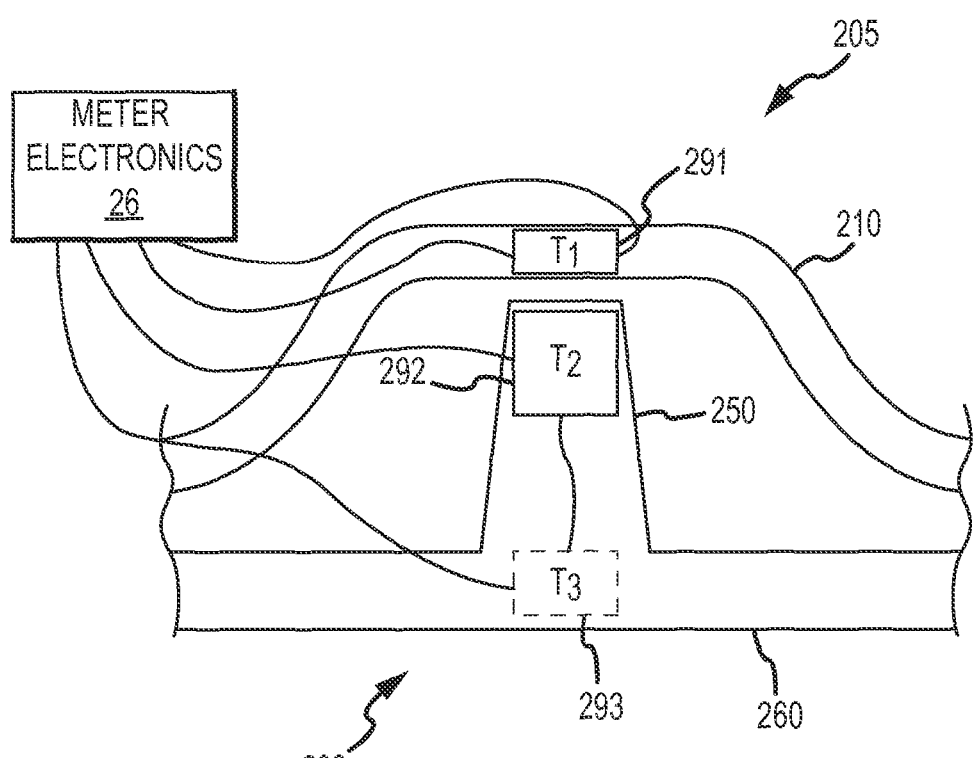
FIG. 3 shows the vibrating flow meter according to another embodiment of the invention.

FIG. 3 shows the vibrating flow meter 205 according to another embodiment of the invention. The improvement in temperature measurement can be used for compensating the flow meter for thermal stress, as in straight tube meters. In this embodiment, the conduit temperature sensor $T_1$ 291 comprises a first temperature measuring circuit and the balance temperature sensors $T_2$ 292 and $T_3$ 293 comprise an independent second temperature measuring circuit. As a result, the meter electronics 26 receives separate flow conduit and balance structure temperature measurements. This embodiment may be employed where thermal stress is significant, such as in straight or slightly curved flow conduits, for example.

Thermal stress is caused by a difference in temperature between the flow conduit and other parts of the meter, as when hot fluid flows through a meter in a cold environment. Thermal stress compensation requires that two temperatures be known: that of the flow conduit and that of the weighted average of other meter components. The flow conduit temperature is used separately from the weighted average in some embodiments of modulus compensation of the flow tube. In addition, the difference between the flow conduit temperature and the weighted average temperature can then also be determined.

The improvement in temperature measurement can be used with curved tube meters for compensating the flow meter for modulus shift. The temperatures of regions of importance of the vibrating system of the flow conduit and the balance structure are measured such that the weighted average temperature is used to determine and compensate for the modulus shift of the vibrating structure.

Because it is highly unlikely that the temperature importance ratio is exactly two-to-one, or any other integer ratio, the accuracy of the stress compensation may be unproved by matching the exact ratio with the resistance ratio.

In some embodiments, the thermal stress compensation equation comprises:

$$FCF = K1 * T_{vib} + K2 * (T_{tube} - T_{avg}) \tag{1}$$

where $T_{vib}$ is the weighted average temperature of the vibrating system and $T_{avg}$ is the weighted average of the thermal stress components. In curved tube meters, K2 may be small enough to render the second term insignificant.

Given a linear relationship between the temperature difference and the error in the tube period squared (due to thermal stress), it is a simple matter to determine the proportionality constants (K1 and K2) through thermal calibration. Alternatively, the weighted average temperature $T_{avg}$ may be replaced (or augmented) by a balance structure temperature measurement. Thereafter, the meter can be compensated for thermally-generated error.

The first compensation term ($K1*T_{vib}$) may perform elastic modulus compensation of the vibrating structure. The second compensation term ($K2*(T_{tube}-T_{avg})$) may perform thermal stress compensation.

Generally, if the flow conduit 210 and the balance structure 208 are of the same material, then thermal stress generally only occurs with a difference in temperature between the flow conduit temperature and the balance structure average temperature.

All Coriolis flow meters require compensation to correct the signals that are generated by the Coriolis force-induced displacement of the vibrating flow tube. These signals represent the phase difference between the spaced-apart flow tube pickoffs and are indicative of the material flow through the flow meter. Curved and straight tube meters both need compensation for the change in elastic modulus of the flow tube with temperature. As the flow tube and balance structure temperatures rise, the modulus decreases and the meter becomes more sensitive. Compensation for the change in the elastic modulus is achieved by use of temperature sensors on the vibrating structure and the use of the temperature measurements in an appropriate compensation algorithm in the meter electronics.

The density is derived from the resonant frequency of the flow conduit plus any fluid within the conduit, whether flowing or non-flowing. The density is determined as:

$$\rho = K\left(\frac{1}{f}\right)^2 + b \qquad (2)$$

Here, the (b) term is a calibration factor that is usually determined during a calibration operation, while the (f) term is the frequency of the vibrational response of the flow meter. The K term represents the stiffness of the meter and includes the elastic modulus of the meter material. Clearly, changes in the elastic modulus due to temperature will also affect density measurements.

Figure 4:
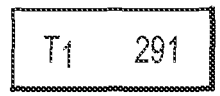
FIG. 4 shows the temperature sensors where the resistance ratio is about 1:2.
Figure 4:
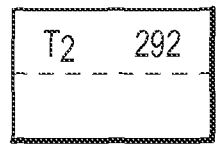

FIG. 4 shows the temperature sensors 291 and 292 where the resistance ratio is about 1:2. For example, the conduit temperature sensor $T_1$ 291 can have an electrical resistance of about 100 ohms, while the balance temperature sensor $T_2$ 292 can have a resistance of about 200 ohms. This is one example, and other resistance values can be employed. Consequently, the balance temperature sensor $T_2$ 292 has a resistance of about two times the resistance of the conduit temperature sensor $T_1$ 291.

Again, the two temperature sensors are shown in physical sizes that graphically represent their relative electrical resistances. However, it should be understood that the two temperature sensors may be of any size, and their physical proportions do not necessarily control or affect their resistance levels.

Figure 5:
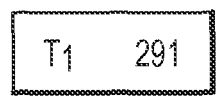
FIG. 5 shows the temperature sensors where the resistance ratio is about 1:5.
Figure 5:
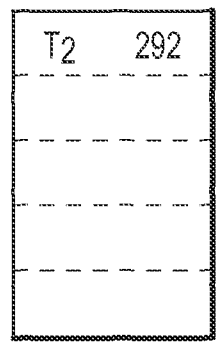

FIG. 5 shows the temperature sensors 291 and 292 where the resistance ratio is about 1:5. For example, the conduit temperature sensor $T_1$ 291 can have an electrical resistance of about 100 ohms, while the balance temperature sensor $T_2$ 292 can have a resistance of about 500 ohms. This is one example, and other resistance values can be employed. Consequently, the balance temperature sensor $T_2$ 292 has a resistance of about five times the resistance of the conduit temperature sensor $T_1$ 291.

Figure 6:
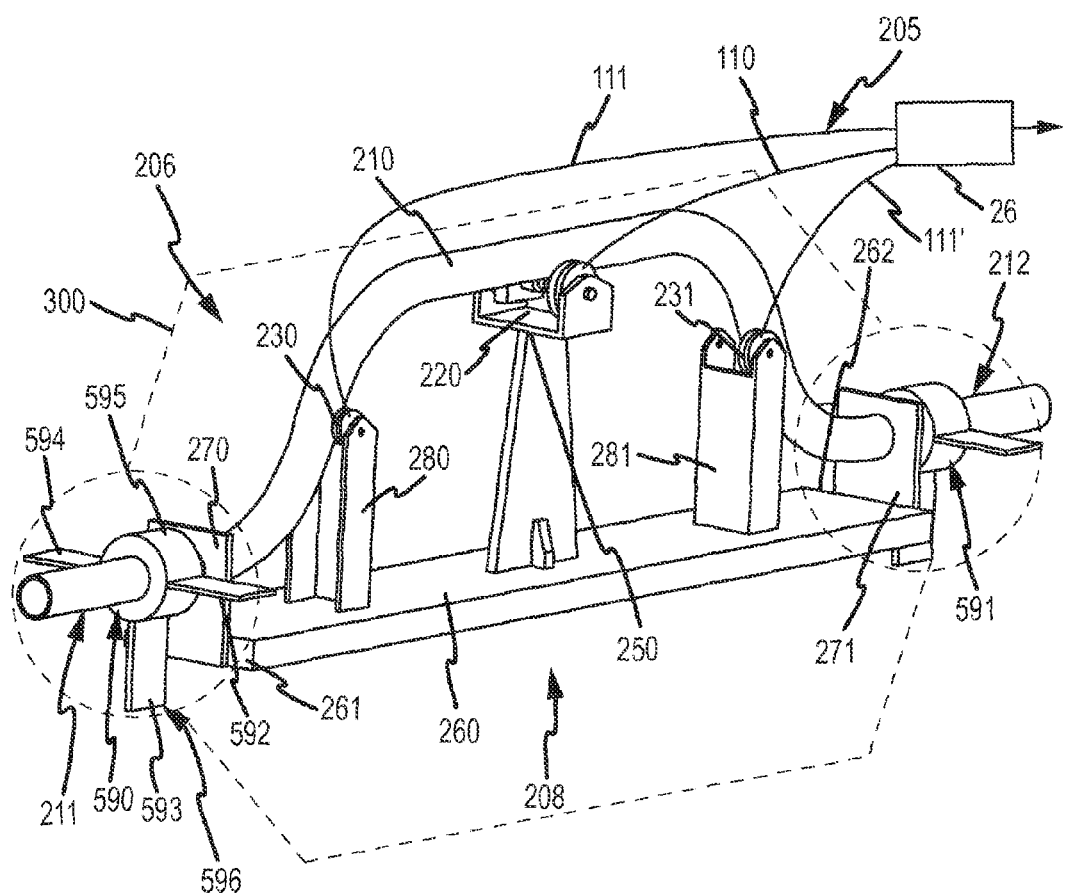
FIG. 6 shows a vibrating flow meter according to the invention.

FIG. 6 shows a vibrating flow meter 205 according to the invention. FIGS. 6-9 illustrate examples of a vibrating flow meter 205 in the form of a Coriolis flow meter, comprising a sensor assembly 206 and a balance structure 208. The one or more meter electronics 26 are connected to sensor assembly 206 via leads 110, 111, 111' to measure a characteristic of a flowing substance, such as, for example, density, mass flow rate, volume flow rate, totalized mass flow, temperature, and other information. The meter electronics 26 can transmit the information to a user or other processor.

Figure 1:
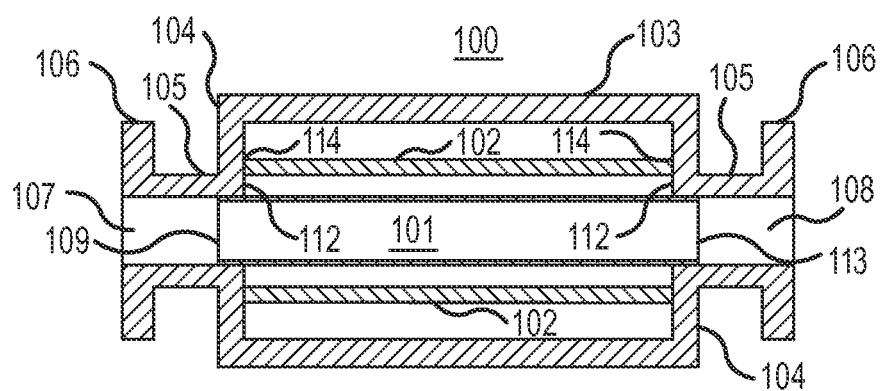
FIG. 1 depicts a single conduit type vibrating flow meter of the prior art.

The sensor assembly 206 includes a conduit 210 that defines a flow path for receiving a flowing substance. The conduit 210 may be bent, as shown, or may be provided with any other shape, such as a straight configuration or an irregular configuration. When sensor assembly 206 is inserted into a pipeline system which carries the flowing substance, the substance enters sensor assembly 206 through an inlet flange (not shown), then it flows through the conduit 210, where a characteristic of the flowing substance is measured. Following this, the flowing substance exits the conduit 210 and passes through an outlet flange (not shown). Those of ordinary skill in the art appreciate that the conduit 210 can be connected to the flanges, such as flanges 106, shown in FIG. 1, via a variety of suitable means. In the present embodiment, the conduit 210 is provided with end portions 211, 212 that extend generally from connectors 270, 271 and connect to the flanges at their outer extremities.

The sensor assembly 206 of the present example includes at least one driver 220. The driver 220 includes a first portion 220A connected to a driven member 250 of the balance structure 208 and a second portion 220B connected to the conduit 210. The first and second portions 220A, 220B may correspond to a drive coil 220A and a drive magnet 220B, for example. In the present embodiment, the driver 220 preferably drives the driven member 250 and conduit 210 in phase opposition.

Figure 7:
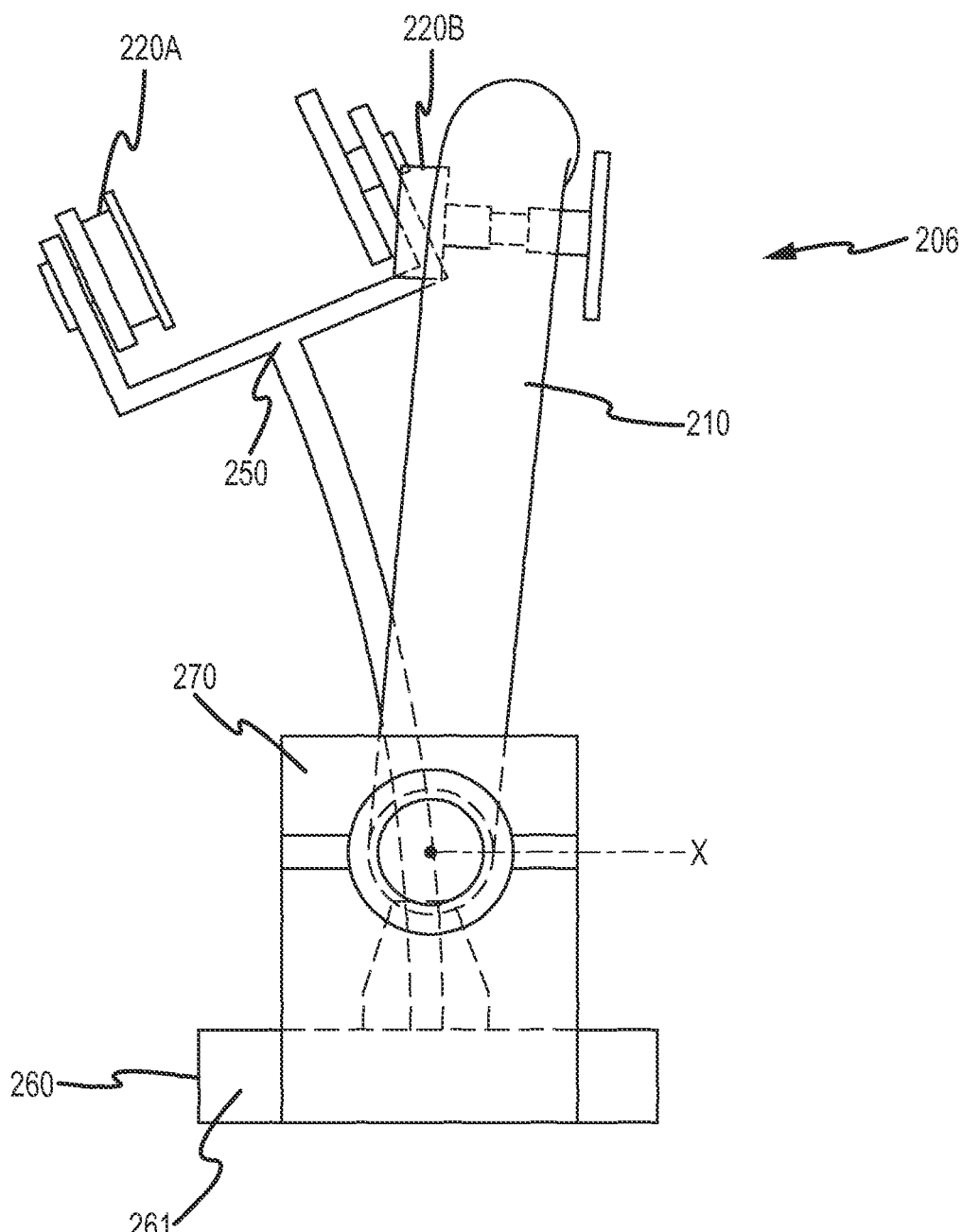
FIG. 7 shows that the driven member and the flow conduit are preferably driven about bending axis X, which is defined in part by the connectors.

FIG. 7 shows that the driven member 250 and conduit 210 are preferably driven about bending axis X, which is defined in part by the connectors 270, 271. According to an embodiment of the invention, the bending axis X corresponds to the inlet-outlet tube axis. The driven member 250 bends from the base 260. The driver 220 may comprise one of many well known arrangements, including for example, and not limitation piezoelectric elements or an electromagnetic coil/magnet arrangement.

As shown in FIG. 6, the sensor assembly 206 includes at least one pick-off. The embodiment shown is provided with a pair of pick-offs 230, 231. According to one aspect of the present embodiment, the pick-offs 230, 231 measure the motion of the conduit 210. In the present embodiment, the pick-offs 230, 231 include a first portion located on respective pick-off arms 280, 281 and a second portion located on the conduit 210. The pick-off(s) may comprise one of many well known arrangements, including for example, and not limitation piezoelectric elements, capacitance elements, or an electromagnetic coil/magnet arrangement. Therefore, like the driver 220, the first portion of the pick-off may comprise a pick-off coil while the second portion of the pick-off may comprise a pick-off magnet. Those of ordinary skill in the art will appreciate that the motion of the conduit 210 is related to certain characteristics of the flowing substance, for example, the mass flow rate or density of the flowing substance through the conduit 210.

Those of ordinary skill in the art will appreciate that the one or more meter electronics 26 receives the pick-off signals from the pick-offs 230, 231 and provides a drive signal to the driver 220. The one or more meter electronics 26 can measure a characteristic of a flowing substance, such as, for example, density, mass flow rate, volume flow rate, totalized mass flow, temperature, and other information. The one or more electronics 207 may also receive one or more other signals from, for example, one or more temperature sensors (not shown), and one or more pressure sensors (not shown), and use this information to measure a characteristic of a flowing substance. Those of ordinary skill in the art will appreciate that the number and type of sensors will depend on the particular measured characteristic.

FIGS. 6-9 also depict the balance structure 208 of the present embodiment. According to one aspect of the present embodiment, the balance structure 208 is configured to at least partially balance the vibrations of the conduit 210. According to one aspect of the present embodiment, the balance structure 208 is configured to at least partially balance the momentum of the conduit 210.

As shown in FIGS. 6-9, the balance structure 208 includes a base 260 connected to the driven member 250. As shown, the driven member 250 is preferably a cantilevered arm that extends generally orthogonal from the base 260. The base 260 in the present embodiment is preferably relatively massive and immobile as compared to the driven member 250. For example, and not limitation, the base 260 may be provided with a mass at least 5 times greater than that of the driven member 250. For example and not limitation, the base 260 may be provided with a mass at least 5 times greater than the mass of the conduit 210. In some embodiments, these numbers may be greater, for example 14 and 8 times greater than the driven member 250 and the conduit 210, respectively.

The balance structure 208 in the present embodiment is coupled to the conduit 210. As shown, the base 260 includes a pair of connectors 270, 271, which may be in the form of the plates shown or which may be provided with any other shape. In the present embodiment, the connectors 270, 271 couple the base 260 to an interior of the end portions 211, 212 of the conduit 210. In the embodiment shown, the pair of connectors 270, 271 are coupled to opposing end faces 261, 262 of the base 260 to the respective end portions 211, 212 of the conduit 210.

According to one aspect of the present embodiment, the conduit 210, the driven member 250, and the base 260 are configured to provide a balanced system. It should be appreciated that the system may not be absolutely balanced. However, the system is designed to be more balanced than prior art systems that do not include the balance structure 208. In the present embodiment, the conduit 210 and the driven member 250 act as two separate vibrating systems, which are driven at equal resonant frequencies, in phase opposition about axis X. As shown in FIG. 7, the driven member 250 vibrates at its resonant frequency by flexing upon the base 260. Those of ordinary skill in the art will appreciate that FIG. 7 represents an exaggeration of the motions involved, in order to better convey the concepts of the present embodiment. Also shown in FIG. 7, the conduit 210 vibrates out of phase with the driven member 250.

The motion of the conduit 210 about axis X applies torque to the connectors 270, 271. Those of ordinary skill in the art will also appreciate that the motion of the driven member 250 about the axis X also applies torque to the connectors 270, 271, via the base 260. Assuming, for the sake of simplicity, that the mass of the conduit 210, including the mass of the flowing substance, and the mass of the driven member 250 are equal, then the driven member 250 and conduit 210 may be driven in phase opposition, at equal frequency, and with equal amplitude to provide a balanced system.

In this example, the momentum of both the conduit 210 and the driven member 250 are balanced, since momentum is the product of mass and velocity and velocity is proportional to vibration amplitude. The result being that the torques applied to the connectors 270, 271 are nearly equal and of opposite sign, thus canceling out. Further, motionless nodes are located substantially along the end portion 211, 212 axes and substantially where the connectors 270, 271 connect to the conduit 210. Accordingly, an overall balanced system is provided and torque and vibrations substantially cancel out. Furthermore, little or no torque is applied to the outer extremities of the end portions 211, 212 of the conduit 210 and to the flanges.

According to one aspect of the present embodiment, the conduit 210 and balance structure 208 are preferably isolated from any connecting structures by relatively soft mounts, which are designed to limit the translation of motion to any connecting structures. Accordingly, the conduit 210 and balance structure 208 function as an isolated vibrating structure with two masses vibrating in phase opposition at the same frequency, which self balances. Accordingly, there are two vibrating systems, i.e. a vibrating conduit system, which may include the conduit 210 or the conduit 210, as well as the connectors 270, 271 and the base 260, and the vibrating driven member system, which may include the driven member 250 or the driven member 250, as well as the connectors 270, 271 and base 260, as hereinafter discussed. The two vibrating systems are separated by common motionless nodes that preferably substantially lie upon the axis of end portions 211, 212 of the conduit 210, substantially proximate to the connectors 270, 271.

Advantageously, the present arrangement may also provide numerous advantages when the mass of the conduit 210 changes. For example, the mass of the conduit 210 may increase, such as, for example, when the mass of the flowing substance within the conduit 210 increases or the mass of the conduit 210 itself increases due to, for example, a coating buildup. When this occurs, the vibration frequency and the vibration amplitude of the conduit 210 decrease. This occurs automatically as a result of the additional mass and the soft mounting of the combined vibrating structure. Further, as a natural response, the vibration amplitude of the driven member 250 increases. This change in amplitude ratio causes node relocation. However, the nodes merely move inward along the conduit axis X in a region where the conduit's motion is purely rotational about its own axis. The pure rotation may be ensured using the case connects 590, 591. Because no Coriolis force is generated by pure rotation of the conduit about its own axis X, the motion of the nodes along the axis X does not affect the output signal.

Figure 8:
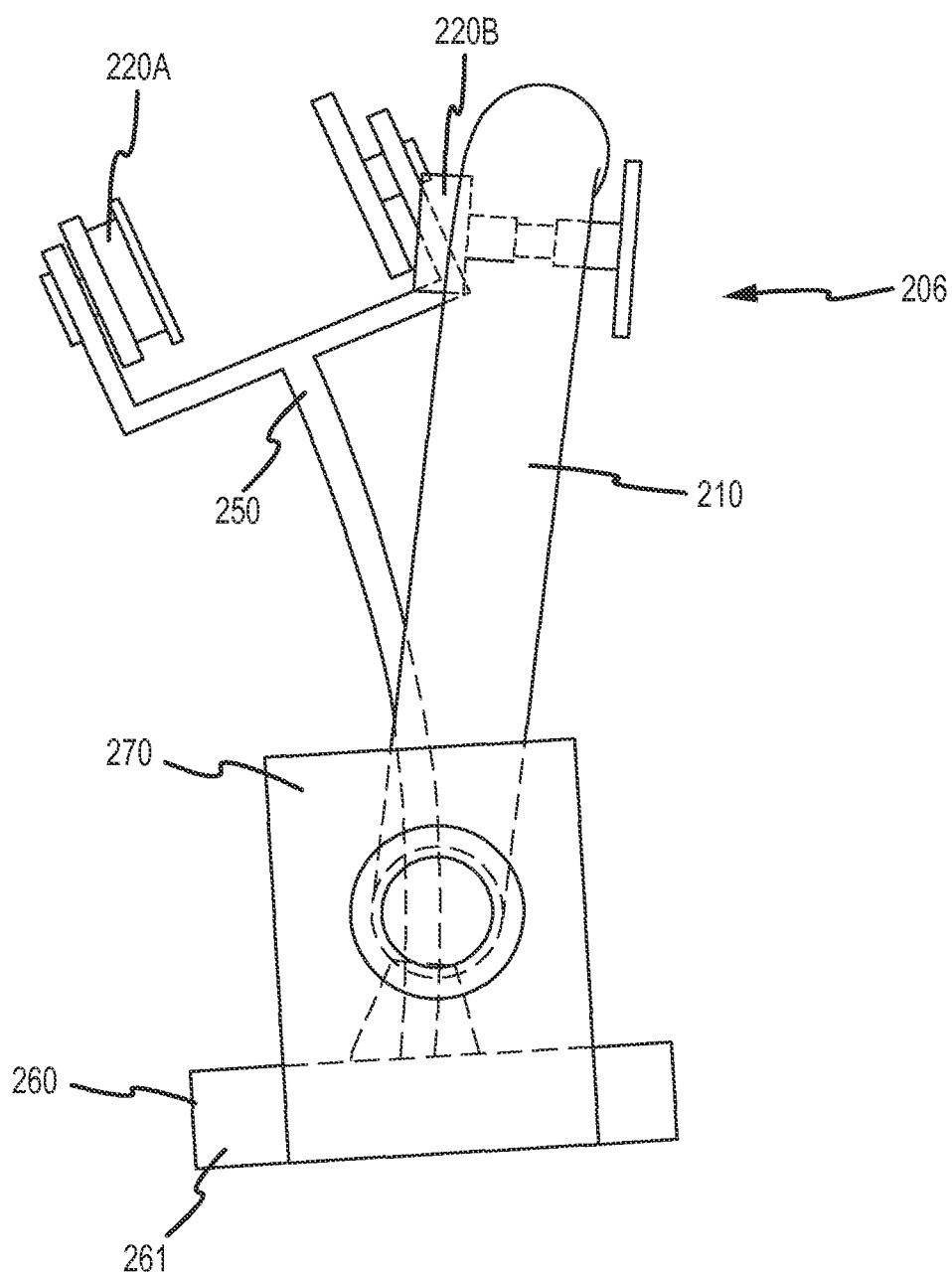
FIG. 8 shows a flow conduit rotation that results in the base rocking slightly, in phase with the driven member.

FIG. 8 shows a flow conduit rotation that results in the base 260 rocking slightly, in phase with the driven member 250. In the present embodiment, the increase in the vibration amplitude of the driven member 250 is reflected as an increase in the range of motion about which the driven member 250 flexes about the base 260. This motion increase is slight, but nevertheless results in additional torque being applied to the base 260 which is further translated as torque to the connectors 270, 271. This additional torque causes the connectors 270, 271 and the base 260 to rotate very slightly, about the axis of the end portions 211, 212 of the conduit 210 in phase with the driven member 250. Although exaggerated in the figures for illustrative purposes, those of ordinary skill in the art will appreciate that the rocking motion of the base is slight because of the mass of the base 260 and the flexibility of the driven member 250.

Accordingly, the base 260 and connectors 270, 271 rotate about an axis X extending through the end portions 211, 212, in phase with the driven member 250, forming a vibrating system. Whereas the frequency of the conduit 210 decreases due to the initial increase of mass, the coupling of the motion of the driven member 250 with the base 260 and connectors 270, 271 has the same effect; an increase in mass and a decrease in frequency. Thus, the frequency of the driven member 250 is lowered to substantially match the frequency of the conduit 210. Similarly, the coupling of the mass of the base 260 and the connectors 270, 271 increases the amplitude of the driven member 250, such that the momentum of the driven member 250 and base 260 equals the momentum of the flow tube 210, and thus balance is restored.

Similarly, the mass of the conduit 210 may decrease, such as, for example, when the mass of the flowing substance within the conduit 210 decreases. When this occurs, the vibration frequency and the vibration amplitude of the conduit 210 increase. This occurs automatically as a result of the reduction in mass. Further, as a natural response, the vibration amplitude of the driven member 250 decreases. Again, this change in amplitude ratio results in node relocation along the inlet-outlet tube axis X with substantially no impact on the meter output.

Figure 9:
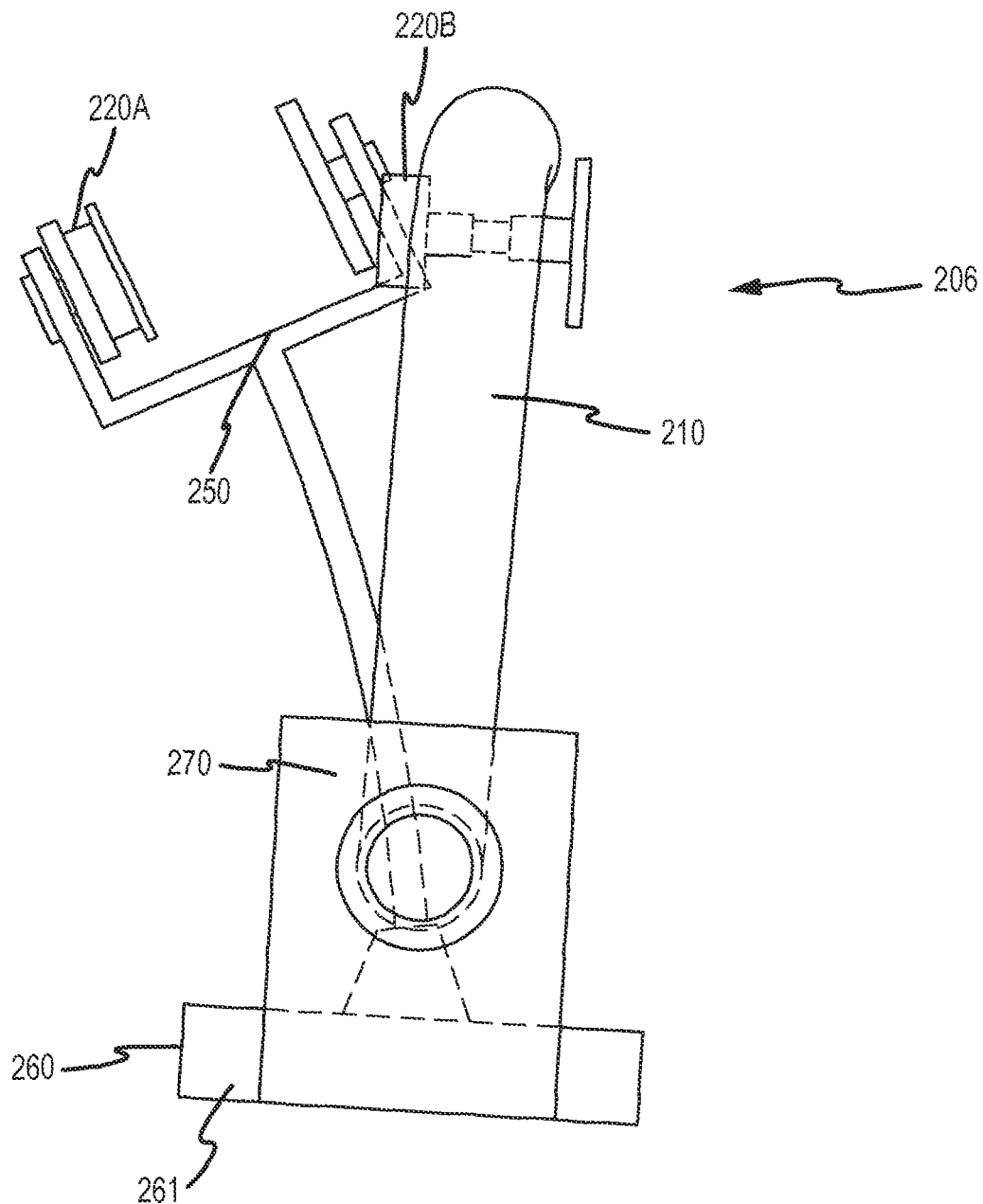
FIG. 9 shows a flow conduit rotation where the base rocks slightly, but in phase with the conduit.

FIG. 9 shows a flow conduit rotation where the base 260 rocks slightly, but in phase with the conduit 210. In the present embodiment, the increase in the vibration amplitude of the conduit 210 is reflected as an increase in the range of motion about which the conduit 210 flexes about the axis X of end portions 210, 211. This motion increase is again slight, but nevertheless results in additional torque being applied to the connectors 270, 271, which is further translated as torque to the base 260. This additional torque causes the connectors 270, 271 and the base 260 to rotate very slightly, about the axis X of the end portions 211, 212 of the conduit 210. This rotation results in the base 260 rocking slightly, but in phase with the conduit 210. Although exaggerated in the figures for illustrative purposes, those of ordinary skill in the art will appreciate that the rocking motion of the base 260 is slight because of the mass of the base 260 and the flexibility of the conduit 210.

Accordingly, the base 260 and connectors 270, 271 rotate about an axis X extending through the end portions 211, 212, in phase with the conduit 210, forming a vibrating system. Whereas the frequency of the conduit 210 is increased due to the lowering of fluid mass, the coupling of the mass of the base 260 and connectors 270, 271 has the opposite effect, lowering the frequency. The net effect is that the frequency is raised slightly. Similarly, the rotation of the mass of the base 260 and the connectors 270, 271 with the flow conduit 210 reduces the amplitude of the driven member 250, and slightly increases its frequency to equal that of the flow conduit 210. Thus, the amplitude ratio of the conduit 210 and the driven member 250 is changed such that the momentum of the driven member 250 and the base 260 is substantially equal to the momentum of the flow conduit 210, and thus, balance is restored.

As the base 260 is preferably provided with a relatively large mass, only a very slight change in the vibration amplitude of the base 260 is required to cause a relatively large change in the vibration characteristics of the conduit 210 and driven member 250. The base 260 slightly rotates with and adds its mass to the flow conduit 210 when a low density fluid is flowing. It slightly rotates with and adds its mass to the driven member 250 when a high density fluid is flowing. It thus adds its mass to the light member (the flow conduit 210 or the driven member 250). Balance is further maintained by the changing of vibration amplitude such that the light member increases its vibration amplitude while the heavier member decreases its vibration amplitude. Furthermore, the small vibration amplitude of the base 260 imparts only a small torque applied to the inner ends of the end portions 211, 212 of the conduit 210. Accordingly, only a very slight amount of torque is applied to the case 300 with fluids of high or low density.

Accordingly, in the present embodiment, the base 260 switches between moving in phase with the conduit 210 and moving in phase with the driven member 250 according to the mass of the flow conduit 210 and more particularly, to the density of the flowing substance. Preferably, the base 260 and the inner ends of the end portions 211, 212 are motionless with flowing substances having a specific gravity of approximately 1000 kg/m$^3$. Preferably, with substances having a specific gravity less than approximately 1000 kg/m$^3$, the conduit 210 has higher amplitude, the driven member 250 has lower amplitude, and the base 260 and connectors 270, 271 rotate very slightly with the conduit 210. The conduit end portions 211, 212, would also rotate very slightly with the conduit 210. Preferably, with substances having a specific gravity of greater than approximately 1000 kg/m$^3$, the conduit 210 has lower amplitude, the driven member 250 has higher amplitude, and the base 260 and connectors 270, 271 rotate very slightly with the driven member 250. In this case, the conduit end portions 211, 212 would also rotate very slightly with the base 260 and connectors 270, 271. Since pure rotation of the conduit 210 about its own axis in end portions 211, 212 does not impart Coriolis acceleration to the flowing substance, meter sensitivity will therefore be largely unaffected. It should be appreciated that the particular fluid densities illustrated above are merely examples and the particular fluid density may vary. According to another embodiment of the invention, the size and stiffness of the balance structure 208 may be chosen such that the base 260 is substantially motionless when there is no fluid within the conduit 210 (an added density of zero). In this case, the base 260 would rotate slightly, flowing with the driven member 250 whatever the fluid density. In yet another embodiment, the size and stiffness of the balance structure 208 may be chosen such that the base 260 rotates with the conduit 210 for all expected fluid density ranges. In other words, some maximum fluid density could be selected where the flow meter is expected to operate with fluids under the maximum fluid density. Therefore, during substantially all expected operating conditions, the fluid density would be under the maximum fluid density resulting in the base 260 rotating with the conduit 210 substantially all of the time. The amplitude of the rotation of the base would, however, vary with the density of the fluid. It should be appreciated that should the fluid density exceed the maximum fluid density, the base 260 would then rotate with the driven member 250 as described above. Likewise, with a fluid density at the maximum fluid density, the base 260 would remain substantially stationary.

It should also be appreciated that while the majority of the description discusses the base 260 moving in response to a change in fluid density, it should be appreciated that other conditions may occur that would change the mass of the conduit 210, such as for example, corrosion, erosion, deposition, etc. Therefore, the base 260 can compensate for a variety of conditions that may change the flow conduit mass.

In the present embodiment, the end portions 211, 212 are preferably long enough, for example, and not limitation, preferably at least three tube diameters long, such that they are substantially soft in torsion. This further reduces the torque applied to the flanges and outer extremities of the end portions 211, 212.

As shown in FIG. 6, the sensor assembly 206 may also include a case 300 and case connects 590, 591. The case connects 590, 591 shown include a first portion 595 connected to the conduit 210 and a second portion 596 connected to the case 300. As shown, the case connects 590, 591 are preferably the only structures supporting the conduit located between the flanges and the connectors 270, 271.

According to one aspect of the present embodiment, the case connects 590, 591 are preferably configured to provide support for the vibrating system that is rigid in axial and transverse translation yet soft in torsion. This may be accomplished by providing the case connects 590, 591 with deformable members 592, 593, 594, for example, which extend radially with respect to the axis of the end portions 211, 212 of the conduit 210. Although three deformable members 592, 593, 594 are provided, it should be appreciated that any number of deformable members 592, 593, 594 may be used and the particular number of deformable members should not limit the scope of the present invention. They may be mounted to the conduit 210 in any manner, including, for example a central hub 595 connected to the conduit 210. The rigid translational and soft torsional coupling provides at least two functions. First, by limiting the end portions 211, 212 to torsional movement, they constrain the nodes to the end portion axis and thus limit measurement errors associated with node relocations. Secondly, by allowing the end portions freedom to rotate, the vibrating structure is supported torsionally in a very soft manner. The soft mount enables the amplitude ratio to change with fluid density and enables the self-balancing feature of this invention.

Although the present invention has been described in terms of resistive temperature sensors, those skilled in the art recognize that any type of resistive sensor could be used in place of a temperature sensor. For example, one might use a strain gauge which indicates strain in the form of a variable resistance in place of one or more of the temperature sensors described herein. The present invention can be applied using any sensor that indicates a condition by changing its resistance. The essence of the present invention applies equally to any such a configuration.

The vibrating flow meter according to the invention can be employed according to any of the embodiments in order to provide several advantages, if desired. The meter according to the invention provides a thermal elasticity-compensated curved tube meter. The meter according to the invention provides a thermal stress compensated curved tube meter.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A vibrating flow meter, comprising:
   a single curved flow conduit;
   a conduit temperature sensor $T_1$ affixed to the single curved flow conduit;
   a balance structure affixed to and opposing the single curved flow conduit; and
   a balance temperature sensor $T_2$ affixed to the balance structure, wherein a conduit temperature sensor resistance of the conduit temperature sensor $T_1$ and a balance structure temperature sensor resistance of the balance temperature sensor $T_2$ are selected to form a predetermined resistance ratio corresponding to a temperature importance ratio.

2. The vibrating flow meter of claim 1, wherein the predetermined resistance ratio corresponds to the temperature importance ratio between the single curved flow conduit and the balance structure.

3. The vibrating flow meter of claim 1, wherein the balance structure comprising:
   a base coupled to the single curved flow conduit; and
   a driven structure extending from the base, with a first driver portion of a vibratory driver being affixed to the driven structure and configured to interact with a second driver portion affixed to the single curved flow conduit.

4. The vibrating flow meter of claim 3, wherein the driven structure comprises a cantilevered arm that extends generally orthogonally from the base.

5. The vibrating flow meter of claim 3, wherein the predetermined resistance ratio corresponds to the temperature importance ratio between the single curved flow conduit and the driven structure.

6. The vibrating flow meter of claim 3, wherein the predetermined resistance ratio corresponds to the temperature importance ratio between the single curved flow conduit and the base combined with the driven structure.

7. The vibrating flow meter of claim 1, wherein the conduit temperature sensor resistance and the balance structure temperature sensor resistance are used to compensate a shift in elastic modulus with temperature of the single curved flow conduit.

8. The vibrating flow meter of claim 1, wherein the conduit temperature sensor resistance and the balance structure temperature sensor resistance are used to compensate a shift in elastic modulus with temperature of the balance structure.

9. The vibrating flow meter of claim 1, wherein the conduit temperature sensor resistance and the balance structure temperature sensor resistance are used to compensate a thermal stress with temperature of the single curved flow conduit.

10. The vibrating flow meter of claim 1, wherein the conduit temperature sensor resistance and the balance structure temperature sensor resistance are used to compensate a thermal stress with temperature of the balance structure.

11. The vibrating flow meter of claim 1, wherein the balance temperature sensor $T_2$ further comprises two or more balance temperature sensors $T_2$ and $T_3$ affixed to one or more locations of the balance structure and generating a balance structure temperature signal, wherein the two or more balance structure temperature sensor resistances at the one or more balance structure locations form a combined balance structure resistance related to thermal importances of the one or more balance structure locations.

12. A method of measuring temperature in a vibrating flow meter, the method comprising:
   measuring a conduit electrical current flowing through a conduit temperature sensor $T_1$ affixed to a single curved flow conduit of the vibrating flow meter;
   measuring a balance electrical current flowing through a balance temperature sensor $T_2$ affixed to a balance structure of the vibrating flow meter, with the balance structure being affixed to and opposing the single curved flow conduit; and
   performing one or more flow meter temperature compensations using the temperature measurement, wherein a conduit temperature sensor resistance of the conduit temperature sensor $T_1$ and a balance structure temperature sensor resistance of the balance temperature sensor $T_2$ are selected to form a predetermined resistance ratio corresponding to a temperature importance ratio.

13. The method of claim 12, wherein the predetermined resistance ratio corresponds to a temperature importance ratio between the single curved flow conduit and the balance structure.

14. The method of claim 12, wherein the balance structure comprises:
   a base coupled to the single curved flow conduit; and
   a driven structure extending from the base, with a first driver portion of a vibratory driver being affixed to the driven structure and configured to interact with a second driver portion affixed to the single curved flow conduit.

15. The method of claim 14, wherein the driven structure comprises a cantilevered arm that extends generally orthogonally from the base.

16. The method of claim 14, wherein the predetermined resistance ratio corresponds to a temperature importance ratio between the single curved flow conduit and the driven structure.

17. The method of claim 14, wherein the predetermined resistance ratio corresponds to a temperature importance ratio between the single curved flow conduit and the base combined with the driven structure.

18. The method of claim 12, wherein the conduit temperature sensor resistance and the balance structure temperature sensor resistance are used to compensate a shift in elastic modulus with temperature of the single curved flow conduit.

19. The method of claim 12, wherein the conduit temperature sensor resistance and the balance structure temperature sensor resistance are used to compensate a shift in elastic modulus with temperature of the balance structure.

20. The method of claim 12, wherein the conduit temperature sensor resistance and the balance structure temperature sensor resistance are used to compensate a thermal stress with temperature of the single curved flow conduit.

21. The method of claim 12, wherein the conduit temperature sensor resistance and the balance structure temperature sensor resistance are used to compensate a thermal stress with temperature of the balance structure.

22. The method of claim 12, wherein the balance temperature sensor $T_2$ further comprises two or more balance temperature sensors $T_2$ and $T_3$ affixed to one or more locations of the balance structure and generating a balance structure temperature signal, wherein the two or more balance structure temperature sensor resistances at the one or more balance structure locations form a combined balance structure resistance related to thermal importances of the one or more balance structure locations.

23. A method of forming a vibrating flow meter, the method comprising:
    forming a flow meter assembly including a single curved flow conduit and a balance structure affixed to and opposing the single curved flow conduit;
    affixing a conduit temperature sensor $T_1$ to the single curved flow conduit; and
    affixing a balance temperature sensor $T_2$ to the balance structure, with a conduit temperature sensor resistance of the conduit temperature sensor $T_1$ and a balance structure temperature sensor resistance of the balance temperature sensor $T_2$ being selected to form a predetermined resistance ratio corresponding to a temperature importance ratio.

24. The method of claim 23, wherein the predetermined resistance ratio corresponds to a temperature importance ratio between the single curved flow conduit and the balance structure.

25. The method of claim 23, wherein the balance structure comprises:
    a base coupled to the single curved flow conduit; and
    a driven structure extending from the base, with a first driver portion of a vibratory driver being affixed to the driven structure and configured to interact with a second driver portion affixed to the single curved flow conduit.

26. The method of claim 25, wherein with the driven structure comprising a cantilevered arm that extends generally orthogonally from the base.

27. The method of claim 25, wherein with the predetermined resistance ratio corresponds to a temperature importance ratio between the single curved flow conduit and the driven structure.

28. The method of claim 25, wherein the predetermined resistance ratio corresponds to a temperature importance ratio between the single curved flow conduit and the base combined with the driven structure.

29. The method of claim 23, wherein the conduit temperature sensor resistance and the balance structure temperature sensor resistance being used to compensate a shift in elastic modulus with temperature of the single curved flow conduit.

30. The method of claim 23, wherein the conduit temperature sensor resistance and the balance structure temperature sensor resistance are used to compensate a shift in elastic modulus with temperature of the balance structure.

31. The method of claim 23, wherein the conduit temperature sensor resistance and the balance structure temperature sensor resistance are used to compensate a thermal stress with temperature of the single curved flow conduit.

32. The method of claim 23, wherein the conduit temperature sensor resistance and the balance structure temperature sensor resistance are used to compensate a thermal stress with temperature of the balance structure.

33. The method of claim 23, wherein affixing the balance temperature sensor $T_2$ further comprises affixing two or more balance temperature sensors $T_2$ and $T_3$ to one or more locations of the balance structure and generating a balance structure temperature signal, wherein the two or more balance structure temperature sensor resistances at the one or more balance structure locations form a combined balance structure resistance related to thermal importances of the one or more balance structure locations.

* * * * *

UNITED STATES PATENT AND TRADEMARK OFFICE
CERTIFICATE OF CORRECTION

PATENT NO. : 9,170,143 B2  
APPLICATION NO. : 13/982451  
DATED : October 27, 2015  
INVENTOR(S) : Craig Brainerd Van Cleve Page 1 of 1

It is certified that error appears in the above-identified patent and that said Letters Patent is hereby corrected as shown below:

In the Claims

Column 20, Line 5 remove the word "with"

Column 20, Line 8 remove the word "with"

Signed and Sealed this  
Twenty-sixth Day of April, 2016

Michelle K. Lee  
*Director of the United States Patent and Trademark Office*